No. 729,376. PATENTED MAY 26, 1903.
M. MAURER.
QUICK WEIGHING ATTACHMENT FOR SCALES.
APPLICATION FILED MAR. 2, 1903.
NO MODEL.
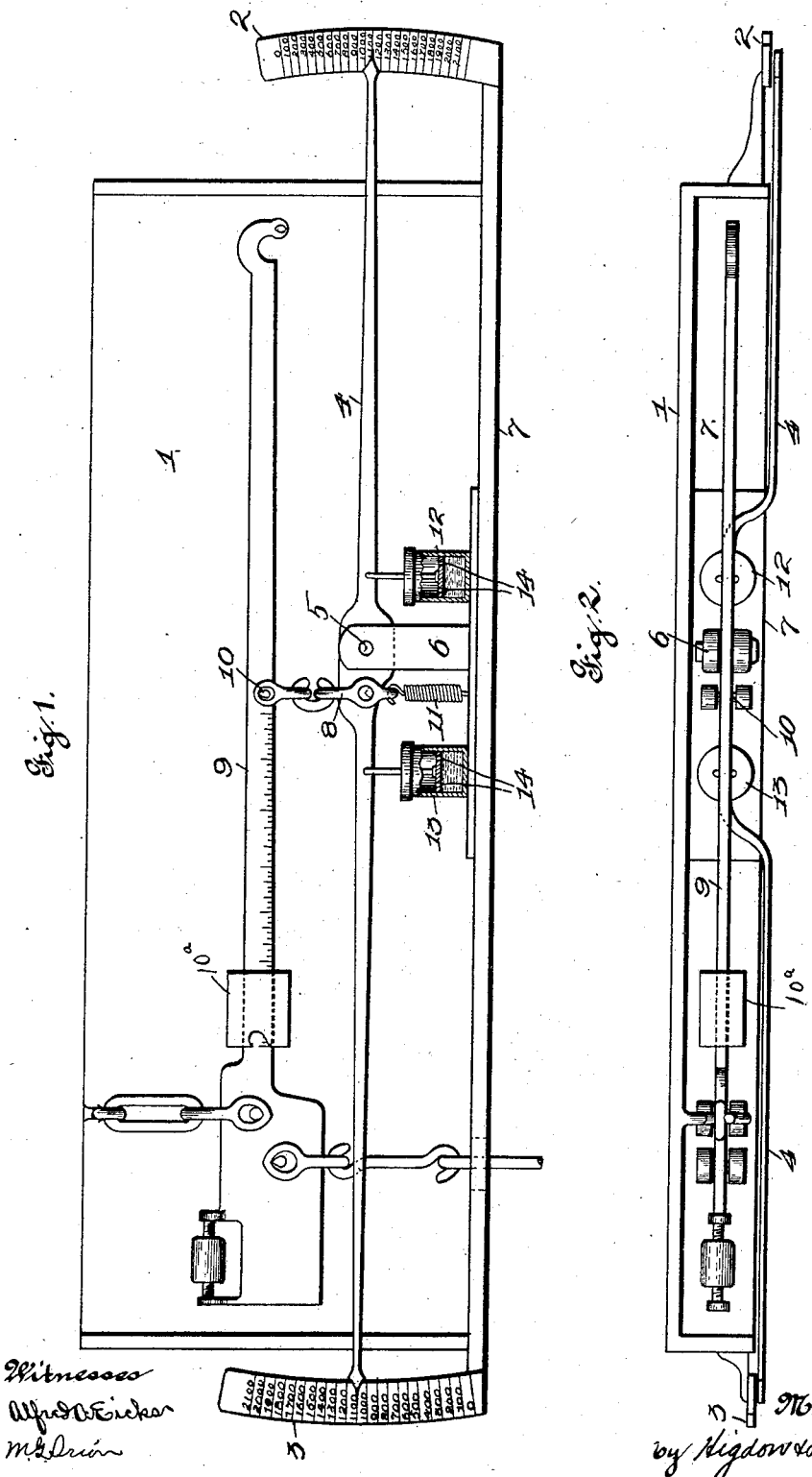

No. 729,376. Patented May 26, 1903.

UNITED STATES PATENT OFFICE.

MARTIN MAURER, OF PUEBLO, COLORADO.

QUICK-WEIGHING ATTACHMENT FOR SCALES.

SPECIFICATION forming part of Letters Patent No. 729,376, dated May 26, 1903.

Application filed March 2, 1903. Serial No. 145,861. (No model.)

*To all whom it may concern:*

Be it known that I, MARTIN MAURER, of the city of Pueblo, Pueblo county, State of Colorado, have invented certain new and useful Improvements in Quick-Weighing Attachments for Scales, of which the following is a full, clear, and exact description, reference being had to the accompanying drawings, forming a part hereof.

My invention relates to quick-weighing attachments for scales; and it consists of the novel construction, combination, and arrangement of parts hereinafter shown, described, and claimed.

The object of my invention is to provide an improved quick-weighing attachment especially adapted for use upon scales carried by cars for weighing specific amounts of lime, coke, asphalt, and coal. It may also be used in connection with hopper-scales of all kinds, as well as depot, mine, track, and wagon scales.

My invention is designed especially for use in connection with scales which are mounted upon small electric cars around mines, furnaces, and the like and operated by two workmen, one of whom usually acts as weigher and motorman and the other as a helper.

I have not deemed it necessary to illustrate the car or other structure upon which the quick-weighing attachment is mounted, as said structure is ordinarily old and forms no part of my invention.

In the drawings, Figure 1 is a sectional elevation of my quick-weighing attachment, and Fig. 2 is a plan view.

It will be seen that I have dispensed with the ordinary loose weights, as I have found that my weighing attachment operates with sufficient accuracy without them. In the handling of coal and articles above mentioned absolute accuracy is not required, and nothing less than fifty pounds is taken into consideration.

1 indicates the frame, which is secured in position upon the car or other structure and is provided at its ends with opposite-curved dials 2 and 3, which are graduated in the present instance from "0" to "2,100," the dial 2 being graduated from the top downwardly, while said dial 3 is graduated from the bottom upwardly. The said dials are curved to correspond with the radius of the double-ended oscillating indicator 4, which is pivoted at 5 to a standard or bracket 6, rising from the base 7. One end of said indicator extends to a point in front of the said dial 2, while the opposite end of said indicator extends over the opposite dial 3.

Motion is communicated to the indicator 4 by means of a loop 8, which is pivotally connected to the ordinary scale-beam 9 at 10, which should be located about the center of the length of the latter, although such connection can be made at any suitable point upon said beam to provide the proper throw of the indicator.

The scale-beam 9 is provided with the usual graduations and sliding poise $10^a$.

11 indicates a coil-spring which is secured at its lower end to some part of the base 7 and has its upper end attached to the said loop 8. All the bearing-points should be knife-edged, as usual in scale construction. Said spring 11 should be adjusted to correspond with the graduation upon the dials 2 and 3.

12 and 13 respectively indicate two common dash-pots, which are mounted upon the base 7, and the pistons thereof are connected one to one arm of said indicator 4 and the other to the opposite arm thereof on opposite sides of the standard 6. Both dash-pots are about half-filled with common coal-oil or other suitable liquid, and the function of said dash-pots is to prevent undue vibration of the said indicator and beam during operation. The said dash-pots almost instantaneously bring the indicator to the proper indication upon the dials, and the weighing operation will be thereby quickly accomplished without the manipulation of loose weights. The pistons of said dash-pots are provided with a small aperture 14, which will permit a quantity of the liquid to pass above said pistons during operation.

The load is supplied to the beam 9 in the usual manner, and the connections need not be specifically described.

My improved quick-weighing attachment will not be affected injuriously by climatic changes and is very simple and not likely to get out of order. It operates almost entirely without friction, as there is no gearing, gear-bars, or pinions.

My attachment is especially designed for use in places where the weigher cannot control the quantity of material which is placed in or upon the scale from the elevator-chute, hopper, ore-pens, coal-chutes, cars, wagons, or asphalt-heater, &c.

In operation should the weigher want four thousand four hundred and eighty pounds of coal loaded from a coal chute or elevator he will set the slide 10$^a$ on the beam 9 about one thousand pounds less than the weight wanted—that is, three thousand four hundred and eighty pounds. The missing one thousand pounds he will then weigh by means of the weighing attachment as the said beam moves upward. This will give the helper or weigher sufficient time to close the chute or elevator-door or the ore-pen and will obviate overloading. Prior to the use of my attachment the overloads on trolley scale-cars used for hauling ore, lime, and coke were as high as eighteen hundred pounds on three tons, and this overloading caused considerable trouble and expense. By means of my improved attachment all overloading is avoided.

I claim—

1. The improved quick-weighing attachment, comprising a double-ended oscillating indicator, graduated dials at each end of said indicator, a scale-beam extending parallel to the indicator, and connections between the said beam and said indicator whereby they will move simultaneously, substantially as specified.

2. The improved quick-weighing attachment, comprising a double-ended oscillating indicator, graduated dials at each end of said indicator, a scale-beam extending parallel to the indicator, connections between said beam and said indicator whereby they will move simultaneously, and a dash-pot connected to said indicator, substantially as specified.

3. The improved quick-weighing attachment, comprising a double-ended oscillating indicator, graduated dials at each end of said indicator, a scale-beam extending parallel to the indicator, connections between said beam and said indicator whereby they will move simultaneously, a dash-pot connected to said indicator, and a spring connected to said indicator, substantially as specified.

4. The improved quick-weighing attachment, comprising a double-ended oscillating indicator, graduated dials at each end of said indicator, a scale-beam extending parallel to the indicator, connections between said beam and said indicator whereby they will move simultaneously, two dash-pots connected to said indicator, one on either side of the pivotal point of said indicator, and a spring connected to said indicator, substantially as specified.

In testimony whereof I affix my signature in presence of two witnesses.

MARTIN MAURER.

Witnesses:
LILLIAN ALBERT,
JAMES F. CHAPMAN.